(12) United States Patent
Soika et al.

(10) Patent No.: US 10,330,239 B2
(45) Date of Patent: Jun. 25, 2019

(54) FLEXIBLE PIPELINE

(71) Applicant: NEXANS, Paris (FR)

(72) Inventors: Rainer Soika, Hannover (DE); Michele Di Palma, Springe (DE); Stephan Lange, Wedemark (DE)

(73) Assignee: NEXANS, Courbevoie (FR)

( * ) Notice: Subject to any disclaimer, the term of this patent is extended or adjusted under 35 U.S.C. 154(b) by 97 days.

(21) Appl. No.: 15/277,453

(22) Filed: Sep. 27, 2016

(65) Prior Publication Data

US 2017/0130891 A1    May 11, 2017

(30) Foreign Application Priority Data

Sep. 28, 2015  (EP) .................................... 15306513

(51) Int. Cl.
| | |
|---|---|
| *F16L 59/14* | (2006.01) |
| *F16L 59/02* | (2006.01) |
| *F16L 59/065* | (2006.01) |
| *F16L 59/08* | (2006.01) |
| *F16L 59/153* | (2006.01) |
| *F16L 11/15* | (2006.01) |
| *F16L 11/22* | (2006.01) |
| *F16L 53/70* | (2018.01) |

(52) U.S. Cl.
CPC ............. *F16L 59/141* (2013.01); *F16L 11/15* (2013.01); *F16L 11/22* (2013.01); *F16L 53/70* (2018.01); *F16L 59/029* (2013.01); *F16L 59/065* (2013.01); *F16L 59/08* (2013.01); *F16L 59/153* (2013.01)

(58) Field of Classification Search
CPC . F16L 5/14; F16L 59/14; F16L 59/141; F16L 39/005; F16L 59/065
See application file for complete search history.

(56) References Cited

U.S. PATENT DOCUMENTS 3,565,118 A * 2/1971 Sterns ................... F16L 59/125
                                                             138/112
3,698,440 A * 10/1972 Matthieu ................... F16L 9/14
                                                             138/114

(Continued)

FOREIGN PATENT DOCUMENTS

EP        2253878        10/2011

OTHER PUBLICATIONS

Search Report dated Mar. 17, 2016.

*Primary Examiner* — Brian M King
(74) *Attorney, Agent, or Firm* — Sofer & Haroun, LLP

(57) ABSTRACT

A pipeline to transport a frozen medium is indicated which has an outer transversely to its longitudinal direction undulated limiting pipe, arranged inside are at least one metal pipe for guiding the frozen medium as well as a cooling pipe composed of metal for guiding a second frozen medium. In the limiting pipe hollow areas are available for evacuation. Fitted inside the limiting pipe are at least two transversely to their longitudinal direction undulated metal pipes for guiding the frozen medium, which are each surrounded by a thermal insulation. During the operation of the pipeline the frozen medium is led in different directions through both the metal pipes. Attached around both the metal pipes and the cooling pipe is a pipe shaped closed sleeve composed of a thermally good conductive material that is in contact with the cooling pipe.

6 Claims, 2 Drawing Sheets

(56) References Cited

U.S. PATENT DOCUMENTS

| | | | | |
|---|---|---|---|---|
| 3,810,491 A | * | 5/1974 | Hildebrandt | F16L 59/141 138/149 |
| 3,904,394 A | * | 9/1975 | Prast | F16L 59/065 138/108 |
| 2009/0007594 A1 | | 1/2009 | Dylla | |

* cited by examiner

FLEXIBLE PIPELINE

RELATED APPLICATION

This application claims the benefit of priority from European Patent Application No. 15 306 513.1, filed on Sep. 28, 2015, the entirety of which is incorporated by reference.

BACKGROUND

Field of the Invention

The invention relates to a flexible pipeline to transport a frozen medium which has an outer transversely to its longitudinal direction undulated limiting tube, arranged inside are its at least one transversely longitudinal to its direction undulated metal pipe to guide the frozen medium, as well as a metal composed cooling pipe to guide a second frozen medium, and by which it is evacuated in the available cavity in the limiting tube.

Such a pipeline would, for example, be used for supplying super conductive magnetic systems or cryogenic pumps or larger refrigeration units requiring a cooling medium. They should be flexible and possibly also have a longer length. The pipes used should preferably be composed of high grade steel. They are transversely to their longitudinal direction undulated and as a result not only bendable, but also stable against radial loads. The transversely to their longitudinal direction extending undulations can be constructed helically shaped or ring shaped.

Description of Related Art

In the known pipeline according to EP 2 253 878 B1 there is a second pipe system arranged, between the guiding pipe and the limiting pipe, to guide a thermal screen for the frozen medium conducted through the guiding pipe serving other frozen mediums. The second pipe system is composed of an inner transversely to its longitudinal direction undulated pipe of metal and one with distance and coaxially to the same arranged outside, also transversely to its longitudinal direction undulated pipe of metal. The inner pipe of the second pipe system is arranged spatially close to the guiding pipe of the pipeline and between the guiding pipe of the pipeline and the inner pipe of the second pipe system is a guiding pipe in its relative position to the inner pipe is arranged an immovable holding spacer composed of insulation material. This known pipeline has proven valuable in practice. However, it definitely has a relatively large outer diameter because of the four concentric pipes arranged at a distance from each other.

From the previously mentioned U.S. Pat. No. 3,565,118 A, a pipeline is described which has a guiding pipe composed of metal to guide a frozen medium, where, for example, it deals with a liquid helium, which is fed into the guiding pipe with a temperature of, for example, 4.5 K. Wrapped around the guiding pipe is a rectangular cross section helically shaped band serving as a spacer, that can also be composed of metal. Wound around that band together in the same reverse impact direction is a helically shaped cooling pipe, which guides an outer frozen medium, which deals with a liquid nitrogen with a temperature of, for example, 80 K. Around the unit of guiding pipe and cooling pipe is a placed a metal layer, around which is wound a second helically formed spacer constructed as a band. Over the spacer lies an insulation composed of a plurality of layers, which is surrounded by a transversely to its longitudinal direction undulated outer limiting pipe.

OBJECTS AND SUMMARY

The invention meets the object to further construct the previously described pipeline so that the outer diameter can be reduced compared to the known pipelines.

This object is met according to the invention in
that in the inside of the limiting pipe at least two transversely to their longitudinal direction undulated metal pipes are provided to guide the frozen mediums, which each are surrounded by a thermal insulation and through which the frozen medium during the operation of the pipeline is led in different directions, and
that surrounding the two metal pipes and the cooling pipe is provided a pipe formed closed sleeve composed of a highly conductive thermal material which is in contact with the cooling pipe.

The outer diameter of this pipeline is essentially determined by the diameter of the two metal pipes and the cooling pipe. Their outer diameter can be kept small, taking into account a sufficiently large clear cross section to lead the frozen medium through. The three pipes can be arranged in confined places having contact with each other, so that the diameter of the same surrounding sleeve composed of thermally good conductive material also can be kept small.

The sleeve composed of thermally good conductive material acts in connection with the cooling pipe guiding the frozen medium, which lies on it with good contact, as a thermal screen for the frozen medium in the two metal pipes to counteract the outer occurring warmth. In addition, the frozen medium in the two metal pipes is moved in different directions. As a result, the cooling medium, for example, liquid helium from a cooling plant, is fed into one of the metal pipes. It flows then, for example, as gaseous helium in the other metal pipe back to the cooling plant.

The limiting pipe can basically be attached directly over the sleeve. Practically, another thermal insulation is arranged over the sleeve, and between the sleeve and the limiting pipe, advantageously, an evacuation area is provided between the sleeve and the limiting pipe. The outer diameter of the limiting pipe, which corresponds to the outer diameter of the pipeline, can still, in comparison to the known pipelines, be kept small.

The thermal insulation of the two metal pipes can be composed of conventional insulation material. They can at the same time be constructed of a plurality of bands or non-woven mesh arranged over one another, from which at least one has at least one layer composed of synthetic material, which is coated on one side or both sides with metal.

Advantageously, also the cooling pipe is constructed transversely to the longitudinal direction of the undulated metal pipe.

Copper or aluminum can be advantageously used as a thermally good conductive material for the sleeve.

BRIEF DESCRIPTION OF THE DRAWINGS

An embodiment of the subject of the invention is illustrated in the drawings.

In the drawings.

DETAILED DESCRIPTION

Helium can be used, for example, as a transporting frozen medium and nitrogen as a second frozen medium for the operation of the pipeline. Advantageously, the helium can be contained in one of the pipelines at a temperature of 4.5 K, fed into thermally insulated metal pipes and circulated through the second thermally insulated metal pipe and guided back to the point of insertion. Advantageously the nitrogen is fed into the cooling pipe with a temperature of 80 K. Basically, also another cooling medium and also another temperature can be used. The cooling medium and their temperature will not be described in more detail in the following.

When more than two undulated thermally insulated metal pipes are arranged in the pipeline, there can be, for example, four pipes available with two separate circulations of two different frozen mediums. Instead of helium, other mediums can be used, for example, hydrogen.

Figure 1:
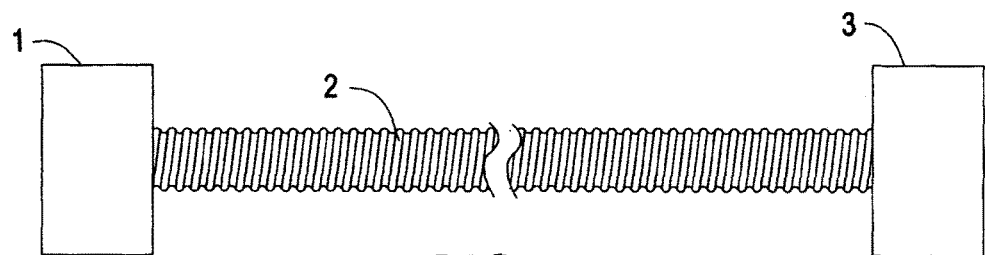
FIG. 1 shows schematically an arrangement for conducting a frozen medium.
Figure 2:
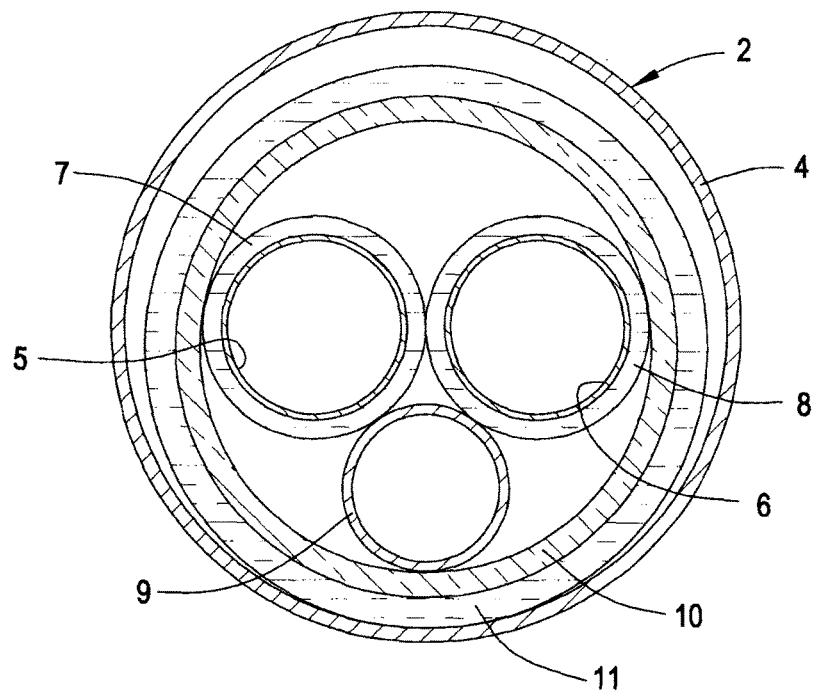
FIG. 2 shows a cross section of a usable pipeline in the arrangement in FIG. 1, according to the invention.
Figure 3:
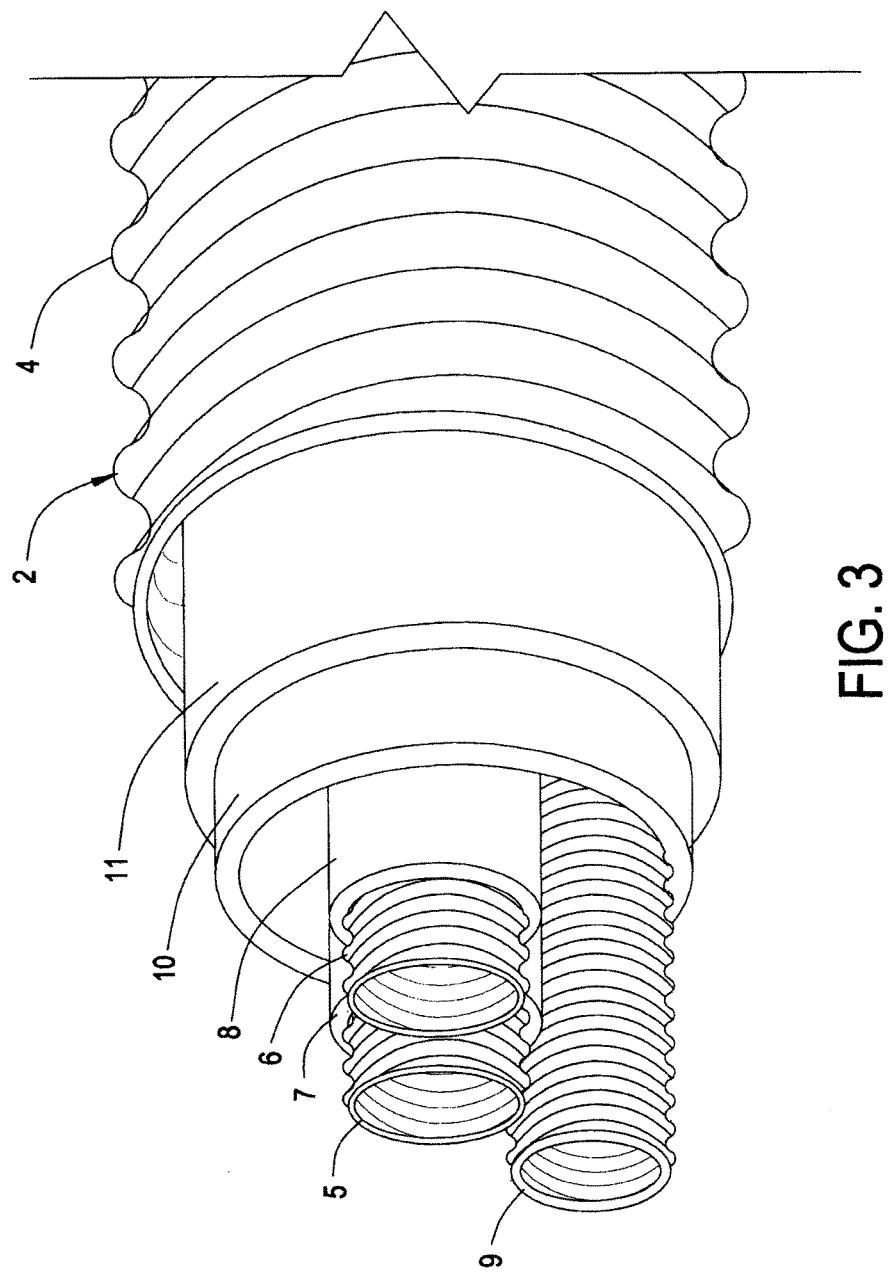
FIG. 3 is a perspective view of the pipeline of FIG. 2.

FIG. 1 shows a schematic illustration of a transmission path for a frozen medium from a cooling plant, preferably a helium cooling plant 1, that is fed into a pipeline 2 attached to the same. The frozen medium is transferred through the pipeline 2 to a plant 3, which may be, for example, a larger cooling plant.

The pipeline 2 has an outer limiting pipe 4 of metal, that is transversely of its longitudinal direction undulated and therefore easily bendable. In the center of the limiting pipe 4 are arranged two transversely to their longitudinal direction undulated metal pipes 5 and 6, which each are surrounded by a thermal insulation 7 or 8. Also, in the center of the pipeline is found as well a cooling pipe 9 composed of metal, that advantageously also can be undulated transversely to its longitudinal direction.

All the described pipes 4, 5, 6, and 9 are preferably composed of high grade steel. They can advantageously all have approximately the same outer diameter.

The three pipes 5, 6 and 9 are surrounded by the same sleeve 10 composed of a thermally good conductive material. They are preferably constructed of at least one band, that is twisted around the three pipes 5, 6 and 9. The sleeve 10 is composed advantageously out of copper or aluminum.

The sleeve 10 is surrounded by a thermal insulation in the illustrated embodiment.

For the thermal insulation 7 and 8 the two metal pipes 5 and 6 as well as 11 of the sleeve 10 the usual insulation material can be used. Advantageously also more bands layered on top of each other can be twisted around the metal pipes 5 and 6 as well as the sleeve 10, which are composed of a layer of synthetic material, on one side or both sides coated with metal. The synthetic material layer can, for example, be composed of polyethylene or out of a biaxially oriented polyester. For the metal, aluminum for example can be used.

All the hollow spaces inside the limiting pipe 4 are evacuated.

By the operation of the pipeline 2 for example, liquid helium from a helium cooling plant 1 is fed into the metal pipe 5 and transported to the plant 3. From the plant 3 gaseous, thus warm helium, is transported through the metal pipe 6 back to the helium cooling plant 1. Simultaneously, during the total operation, liquid nitrogen is in the cooling pipe 9. It will advantageously be moved through the same.

The invention claimed is:

1. Flexible pipeline for transporting a cold liquid or gas medium comprising:
    an outer limiting tube corrugated transversely to its longitudinal direction;
    two metal pipes inside said limiting tube, said two metal pipes corrugated transversely to said longitudinal direction, said metal pipes for guiding said cold liquid or gas medium; and
    a metal cooling pipe, also within said outer limiting tube for guiding a second cold liquid or gas medium,
    wherein said two metal pipes are each surrounded by a thermal insulation,
    wherein said two metal pipes and said metal cooling pipe are all directly abutting one another within said outer limiting tube,
    wherein said cold liquid or gas medium, during the operation of the pipeline is led in different directions, one direction through a first of said metal pipes and the other direction through a second of said metal pipes,
    wherein surrounding said at least two metal pipes and said metal cooling pipe is a closed sleeve composed of a conductive thermal material which is in contact with at least said metal cooling pipe.

2. Pipeline according to claim 1, wherein the closed sleeve is composed of copper or aluminum.

3. Pipeline according to claim 1, wherein the thermal insulation of the two metal pipes guiding the cold liquid or gas medium are composed of a plurality of bands or non-woven mesh arranged one over the other, of which each of said bands has at least a one sided or a two sided synthetic layer coated with metal.

4. Pipeline according to claim 1, wherein the closed sleeve is surrounded by a plurality of bands or non-woven mesh of which each has at least a one sided or a two sided synthetic layer coated with metal.

5. Pipeline according to claim 1, wherein the metal cooling pipe is corrugated transversely to a longitudinal direction of said metal cooling pipe.

6. Pipeline according to claim 1, wherein the at least two metal pipes and the metal cooling pipe can all have substantially the same outer diameter.

* * * * *